US006095798A

United States Patent [19]

Mitani et al.

[11] Patent Number: 6,095,798

[45] Date of Patent: Aug. 1, 2000

[54] COMBUSTION APPARATUS

[75] Inventors: Kazuhisa Mitani; Yukio Fukuta, both of Toyota, Japan

[73] Assignee: Toyota Jidosha Kabushiki Kaisha, Toyota, Japan

[21] Appl. No.: 09/389,468

[22] Filed: Sep. 3, 1999

Related U.S. Application Data

[62] Division of application No. 08/838,336, Apr. 8, 1997.

[30] Foreign Application Priority Data

Apr. 9, 1996 [JP] Japan .................................... 8-86136

[51] Int. Cl.[7] .................................................... F23D 11/44

[52] U.S. Cl. .......................... 431/215; 431/328; 431/170; 431/115; 431/7; 431/11; 432/180

[58] Field of Search .................................... 431/215, 217, 431/326, 328, 7, 170, 11, 207, 115, 116, 166, 167, 354; 126/91 A; 432/179, 180, 181, 209

[56] References Cited

U.S. PATENT DOCUMENTS

| | | | |
|---|---|---|---|
| 3,738,793 | 6/1973 | Reid et al. | 431/328 |
| 3,912,443 | 10/1975 | Ravault | 431/328 |
| 4,355,973 | 10/1982 | Bailey | 126/91 A |
| 4,522,588 | 6/1985 | Todd et al. | 432/181 |
| 4,604,051 | 8/1986 | Davies et al. | 431/170 |
| 4,643,667 | 2/1987 | Fleming | 431/328 |
| 4,676,744 | 6/1987 | Wray et al. | 431/170 |
| 4,752,213 | 6/1988 | Grochowski et al. | 431/328 |
| 4,926,842 | 5/1990 | Watson et al. | 126/360 |
| 5,141,432 | 8/1992 | Bell et al. | 431/7 |
| 5,160,254 | 11/1992 | Bell et al. | 431/7 |
| 5,431,147 | 7/1995 | Tanaka et al. | 431/215 |
| 5,460,519 | 10/1995 | Hirose et al. | 126/91 A |
| 5,570,679 | 11/1996 | Wunning | 126/91 A |
| 5,624,252 | 4/1997 | Charles, Sr. et al. | 431/7 |
| 5,628,629 | 5/1997 | Mitani et al. | 432/180 |
| 5,667,374 | 9/1997 | Nutcher et al. | 431/7 |
| 5,746,194 | 5/1998 | Legutko | 431/326 |

FOREIGN PATENT DOCUMENTS

| | | |
|---|---|---|
| 0 333 239 | 9/1989 | European Pat. Off. . |
| 0 593 121 | 4/1994 | European Pat. Off. . |
| 0 606 782 | 7/1994 | European Pat. Off. . |
| 0 657 696 | 6/1995 | European Pat. Off. . |
| 62-118925 | 7/1987 | Japan . |
| 2 054 822 | 2/1981 | United Kingdom . |

*Primary Examiner*—Ira S. Lazarus
*Assistant Examiner*—Josiah C. Cocks
*Attorney, Agent, or Firm*—Pillsbury Madison & Sutro LLP

[57] ABSTRACT

A combustion apparatus provided with a burner includes a fuel injection nozzle disposed rearward of a gas passable solid and a pre-mixture region between a downstream end of the solid and the fuel injection nozzle. The gas passable solid may be of a straightener type. Air for combustion includes main air and pilot air separated from each other. The apparatus may be coupled to each end of a radiant tube. The apparatus may be provided to a direct and indirect combustion type thermal facilities.

1 Claim, 15 Drawing Sheets

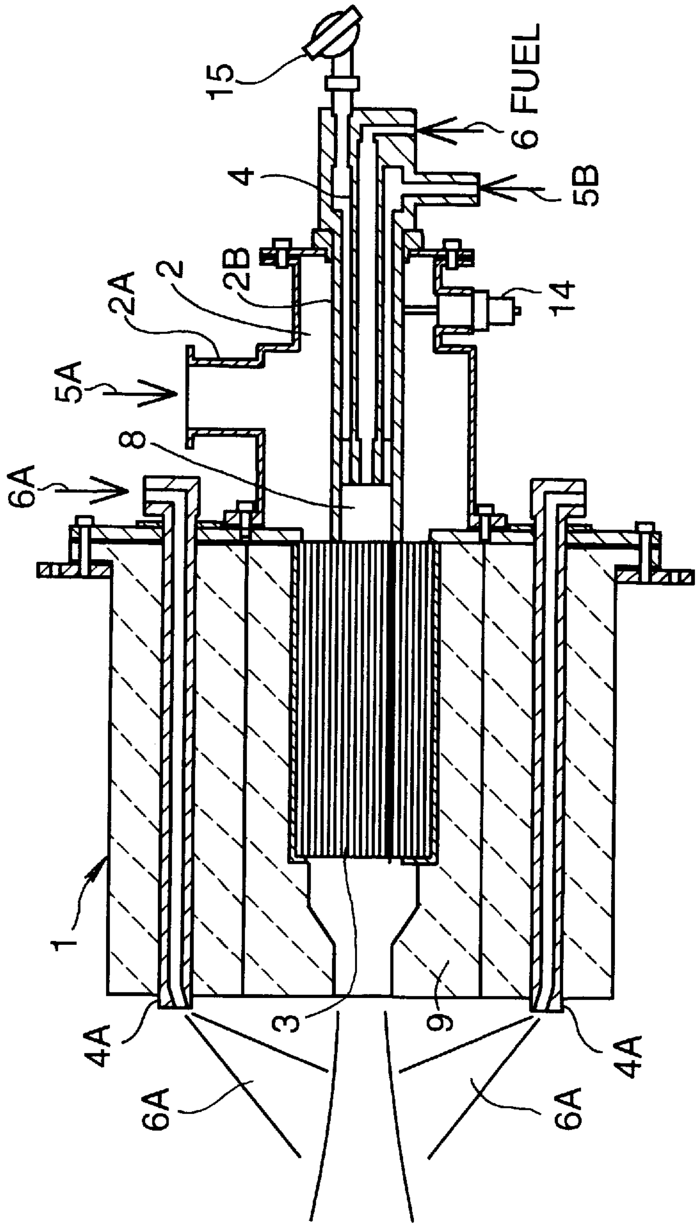
F I G. 16
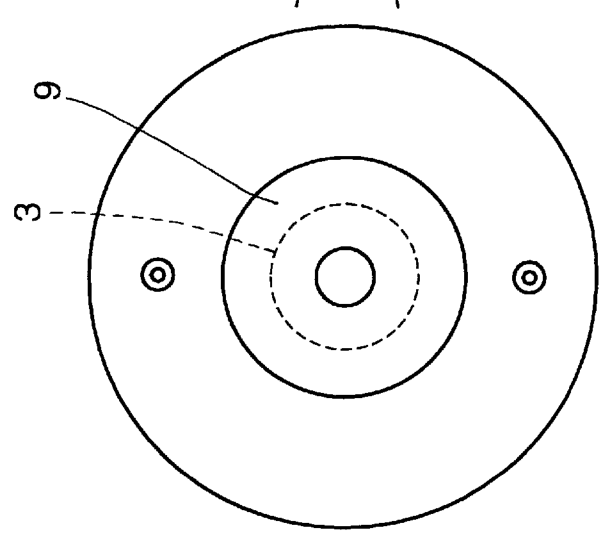
F I G. 17

COMBUSTION APPARATUS

This application is a division of Ser. No. 08/838,336 filed Apr. 8, 1997.

This application is based on application No. HEI 8-86136 filed in Japan on Apr. 9, 1996, the content of which is incorporated hereinto by reference.

BACKGROUND OF THE INVENTION

1. Field of the Invention

The present invention relates to a combustion apparatus wherein a fuel injection portion is located rearward of a gas passable solid (upstream of the solid as viewed in an air flow direction), and a thermal facility provided with the combustion apparatus.

2. Description of Related Art

In a conventional burner, a fuel injection portion is located so as to face a combustion chamber. As a result, combustion is conducted near the fuel injection portion of the burner, so that a temperature of the fuel injection portion is high. Particularly, in a regenerative combustion type burner, since the fuel injection portion is located frontward of a heat storage member (on a combustion chamber side), the fuel injection portion is at a very high temperature.

Further, as a special case, Japanese Utility Model Publication SHO 62-118925 discloses a radiant tube wherein a fuel injection nozzle is located rearward of a heat storage member such that a tip of the nozzle contacts the heat storage member.

However, the above-described conventional apparatuses have the following problems:

With the burner where the fuel injection portion faces the combustion chamber, since the fuel injection portion is at a high temperature, the life of the burner is shortened. If the fuel injection portion is made from heat proof material, cost will be increased and machining will be difficult. Further, since a complicated mechanism cannot be provided to a high temperature portion,. the burner structure will have various limitations.

With the burner in which the fuel injection portion is located rearward of the heat storage member like Japanese Utility Model Publication SHO 62-118925, according to tests conducted, it was seen that no flame was formed due to insufficient mixture of fuel and air. If the fuel injection portion was spaced apart from the heat storage member in order to pre-mix fuel and air, when exhaust gas flows through the heat storage member to heat the heat storage member to a high temperature, the mixture of fuel and air self-ignited and burned within the heat storage member to melt the heat storage member. Therefore, the burner having the fuel injection portion rearward of the heat storage member could not be actually used.

SUMMARY OF THE INVENTION

An object of the present invention is to provide a combustion apparatus wherein a fuel injection portion can be located in a relatively low temperature portion of the apparatus.

A combustion apparatus or heat facility according to the present invention has any one of the following structures:

(A) The combustion apparatus, provided with at least one burner, includes a gas passable solid therein. A fuel injection nozzle is disposed rearward of the gas passable solid (on an upstream side of the gas passable solid as viewed in an air flow direction). A pre-mixture region for pre-mixing fuel and air for combustion is provided between a most downstream portion of the gas passable solid and the fuel injection nozzle.

(B) In a case where the combustion apparatus is a heat storage type burner, an air supply passage for supplying air for combustion includes a main air supply passage and a pilot air supply passage independent of each other. The fuel injection nozzle is disposed within the pilot air supply passage.

(C) In a case where the combustion apparatus is a heat storage type burner provided at each of opposite ends of a radiant tube, a structure similar to the structure (B) is taken.

(D) A direct heating type heat facility such as an industrial furnace, a boiler, and a chemical reaction container provided with the apparatus having the structure (B). An indirect heating type heat facility such as an industrial furnace, a boiler, and a chemical reaction container provided with the apparatus having the structure (C).

In the combustion apparatus of (A), since the fuel injection nozzle is located on a rear side of the gas passable solid, that is, at a relatively low temperature portion of the apparatus, durability of a mechanism including the fuel injection nozzle is improved. Further, the mechanical portion can be machined because the portion does not need to be made from refractory. Further, by using a gas passable solid of a straightener type, it is possible to form a stable flame of a laminar boundary diffusion whereby a stable slack combustion is obtained. Due to the slack combustion, suppression of NOx generation, prolongation of the flame, flattening of a heat flux, prevention of local overheat of the furnace, improvement of durability of the furnace, formation of a bright flame, and improvement of a radiation heat transfer characteristic can be achieved.

In the combustion apparatus of (B) and (C), in addition to the above-described effect of the apparatus (A), since the pilot air continues to flow even during stopping combustion, a fuel flow portion of the heat storage member is prevented from attaining at a high temperature, so that a mixture of fuel and a pilot air does not cause self-ignition and therefore the heat storage member is prevented from melting. Further, since the pre-mixture region is provided, it is possible to ignite a mixture of fuel and air at an exit of the gas passable solid and to form a flame.

In the combustion apparatus of (D), the same effects as those of (B) and (C) are obtained.

BRIEF DESCRIPTION OF THE DRAWINGS

The above and other objects, features, and advantages of the present invention will become more apparent and will be more readily appreciated from the following detailed description of the preferred embodiments of the present invention in conjunction with the accompanying drawing, in which:

FIG. 16 is a cross-sectional view of a combustion apparatus according to a twelfth embodiment of the present invention;

FIG. 17 is a side elevational view of a combustion apparatus according to the twelfth embodiment of the present invention;

DETAILED DESCRIPTION OF THE PREFERRED EMBODIMENT

Figure 1:
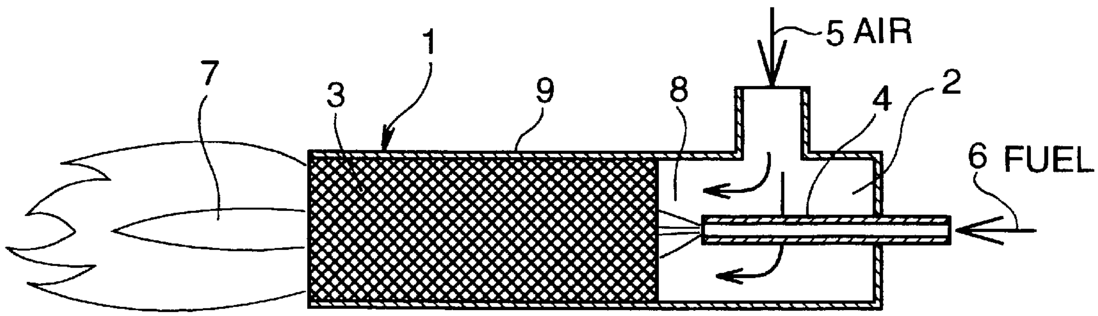
FIG. 1 is a cross-sectional view of a combustion apparatus according to a first embodiment of the present invention.

Portions common or similar to all of the embodiments of the present invention are denoted with the same reference numerals throughout all of the embodiments of the present invention.

First, portions common or similar to all of the embodiments of the present invention will be explained with reference to, for example, FIG. 1.

As illustrated in FIG. 1, a combustion apparatus according to any embodiment of the present invention is provided with at least one burner 1. The apparatus including the burner 1 includes a gas passage 2, a gas passable solid 3 disposed in the gas passage 2, and a fuel injection nozzle (fuel supply nozzle) 4. The gas passable solid 3 has a first end and a second, opposite, end and a first side and a second, opposite, side which correspond to the first end and the second end, respectively. From the first side, air for combustion 5 enters the solid 3 and on the second side flame 7 is formed. The fuel injection nozzle 4 is disposed on the first side of the solid 3. A pre-mixture region 8 for pre-mixing fuel 6 and air for combustion 5 is formed between the first end of the solid 3 and the fuel injection nozzle 4.

The fuel injection nozzle 4 penetrates a casing 9 and supplies fuel 6 to the solid 3 from the first side of the solid. A mixture of fuel and air for combustion is ignited by an ignition apparatus (not shown in FIG. 1, and made from a heat-proof metal or electrically conductive ceramic), so that a flame 7 is formed on the second, front side of the solid 3.

In the combustion apparatus having the above-described structures, since the mechanism portion including the fuel injection nozzle 4 is disposed in a relatively low temperature portion of the apparatus, durability of the apparatus including the burner 1 is improved, and a freedom of design in a high temperature environment also is improved.

Next, portions unique to each embodiment of the present invention will be explained.

With a first embodiment of the present invention, as illustrated in FIG. 1, the solid 3 of the combustion apparatus including the burner 1 may be of a straightener type or of a diffusion type. FIG. 1 shows that the solid 3 is made from diffusion type material. In a case where the solid 3 is of a diffusion type, the pre-mixture region 8 includes a space defined between the solid 3 and the fuel injection nozzle 4.

In the case where the solid 3 is of the diffusion type, while the fuel 6 is flowing within the solid 3, the fuel 6 is mixing with air and is diffusing in an entire transverse cross-section of the solid 3. As a result, the flame 7 is formed in the front of the entire surface of a downstream end of the solid 3. Since the fuel and air for combustion which are at a low temperature flow within the solid 3, the solid 3 is maintained at a relatively low temperature except at a most downstream portion of the solid 3 which is heated by radiation, so that it is possible to freely select a material for the solid 3.

Figure 2:
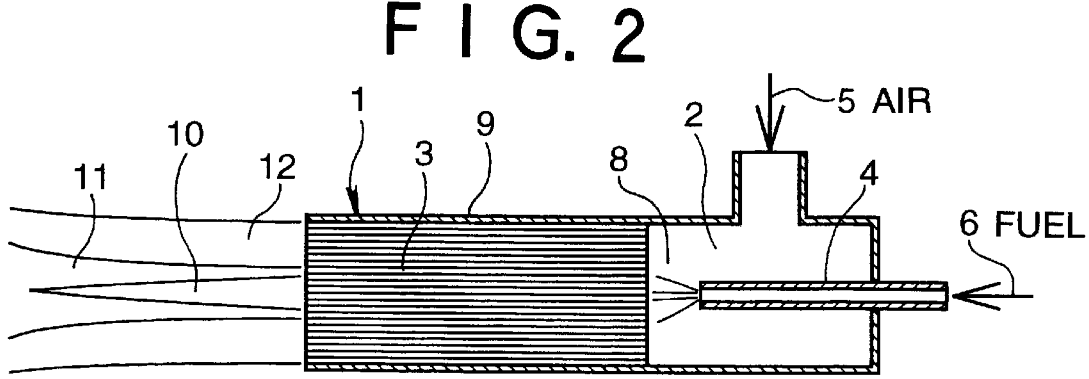
FIG. 2 is a cross-sectional view of a combustion apparatus according to a second embodiment of the present invention.

With a second embodiment of the present invention, as illustrated in FIG. 2, the gas passable solid 3 of the apparatus including the burner 1 is of a straightener type. In this instance, a solid of the straightener type is defined as a solid which includes a lot of passages substantially independent of each other and extending axially and straightens a flow of air for combustion while the air for combustion is flowing within the solid 3.

The solid of the straightener type may be of any structure provided that it has a lot of axially extending passages. For example, the solid of the straightener type may be of a honeycomb structure, of a bundle of solid rods having a number of passages between the rods, of a bundle of pipes each having a small diameter, of a structure made by piling wave plates and flat plates alternatively, and of a structure made by piling a wave plate and a flat plate and then winding the piled plates to the form of a roll. The solid is made from any material provided that it has a required heat-proof characteristic, a required shock-proof characteristic and a required chemical stability. For example, the solid is made from ceramic or metal.

In order to form the solid 3 easily and to reduce thermal stresses generated in the solid, the solid 3 may be divided into a plurality of sections in an axial direction as well as in a circumferential direction of the solid.

In the case where the solid 3 is of the straightener type, when fuel flows in the pre-mixture region 8, fuel mixes with air for combustion at a peripheral portion of the fuel flow, and then enters the gas passable solid 3. In the solid 3, the fuel flow, the mixture flow around the fuel flow, and the air flow around the mixture flow flow independently of each other without mixing with each other, and then flow out from the downstream end of the solid in the form of a cylindrical laminar flow. Immediately after flowing from the solid 3, the mixture of fuel and air for combustion is ignited by an ignition device (not shown in FIG. 2). Fuel gas flow slackly diffuses to the cylindrical burning mixture gas layer to mix with it so that a slack self-combustion is conducted to form a gradually spread flame. Since the combustion is conducted slackly, the flame is elongated in the axial direction so that the fuel is burned more completely in the prolonged combustion. In the combustion in the form of a cylindrical laminar flow, hydrogen generated through decomposition of the fuel is selectively burned prior to combustion of carbon, and the remaining carbon forms an elongated brilliant flame (having yellow color) when slackly burned.

Due to the slack combustion, generation of NOx (nitrogen oxides) is suppressed, so that the amount of NOx contained in the fuel-burnt gas exhausted from the combustion apparatus to the atmosphere is decreased. This means that the combustion is clean and friendly to the environment. Further, due to the slack combustion and provision of a cylindrical air layer of a low temperature surrounding the burning cylindrical mixture layer, a portion of the apparatus (furnace or tube) adjacent to the downstream end of the solid is prevented from locally overheating, thereby the durability of the apparatus is improved. Further, due to the slack combustion and the elongated flame, the heat flux becomes flat in the axial direction of the apparatus so that the heating is uniform and the temperature of the interior of the furnace or the tube can be raised to an allowable limit throughout all portions of the furnace or the tube resulting in improvement of the heat transmittance efficiency.

Figure 3:
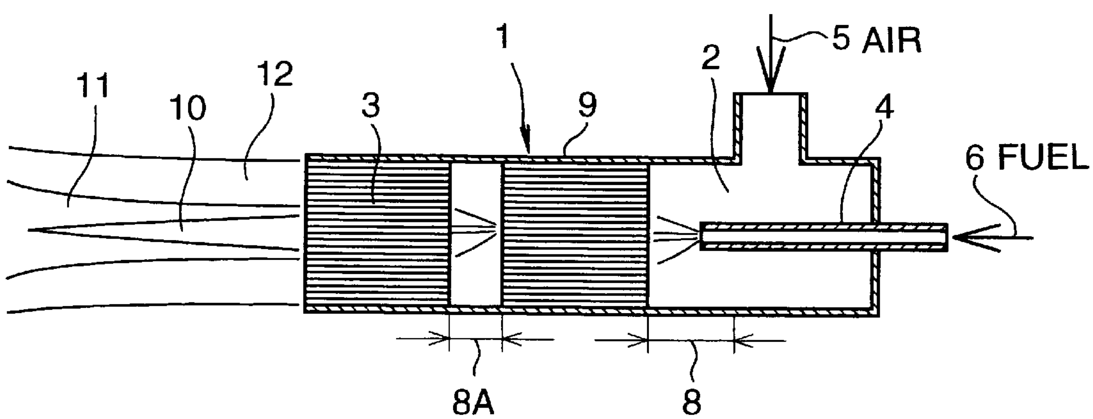
FIG. 3 is a cross-sectional view of a combustion apparatus according to a third embodiment of the present invention.

With a third embodiment of the present invention, as illustrated in FIG. 3, the gas passable solid 3 is of the straightener type, and the pre-mixture region 8 is formed within the gas passable solid 3. In the embodiment of FIG. 3, another pre-mixture region 8A is formed between the upstream end of the solid 3 and the fuel injection nozzle 4.

Due to this structure, a portion of the fuel gas 6 and a portion of the air for combustion 5 pre-mixes with each other in the pre-mixture region 8 to form a mixture. As a result, a cylindrical laminar flow having the fuel gas layer 10, the pre-mixture layer 11 outside the layer 10 and the air layer 12 outside the layer 11 is formed downstream of the solid 3. When the pre-mixture layer 11 is ignited, the combustion explained in the second embodiment of the present invention is conducted.

Figure 4:
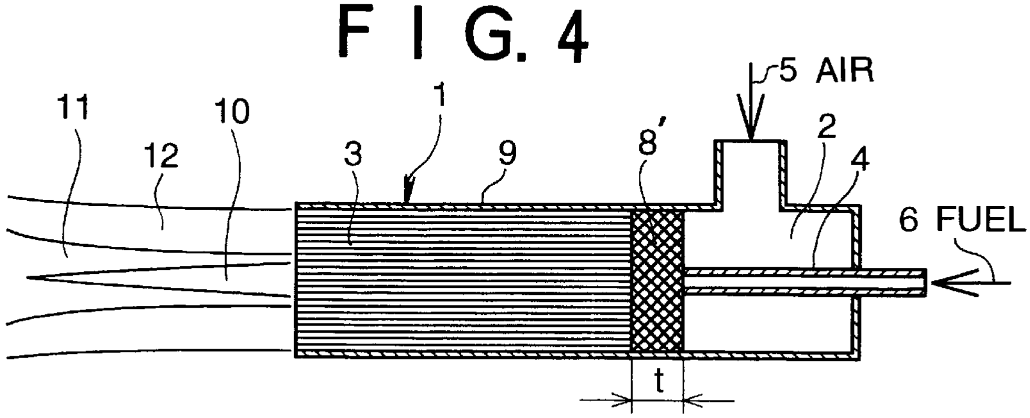
FIG. 4 is a cross-sectional view of a combustion apparatus according to a fourth embodiment of the present invention.

With a fourth embodiment of the present invention, as illustrated in FIG. 4, the gas passable solid 3 is of the straightener type, and the pre-mixture region 8' is of a gas passable type that is made from a gas passable solid (having thickness t) of the diffusion type disposed between the upstream end of the gas passable solid 3 and the tip of the fuel injection nozzle 4. The tip of the fuel injection nozzle 4 may contact the gas passable solid of the diffusion type.

Due to this structure, a portion of the fuel gas 6 and a portion of the air for combustion 5 pre-mixes with each other in the pre-mixture region 8 to form a mixture. As a result, a cylindrical laminar flow having the fuel gas layer 10, the pre-mixture layer 11 outside the layer 10 and the air layer 12 outside the layer 11 is formed downstream of the solid 3. When the pre-mixture layer 11 is ignited, the combustion explained in the second embodiment of the present invention is conducted.

Figure 5:
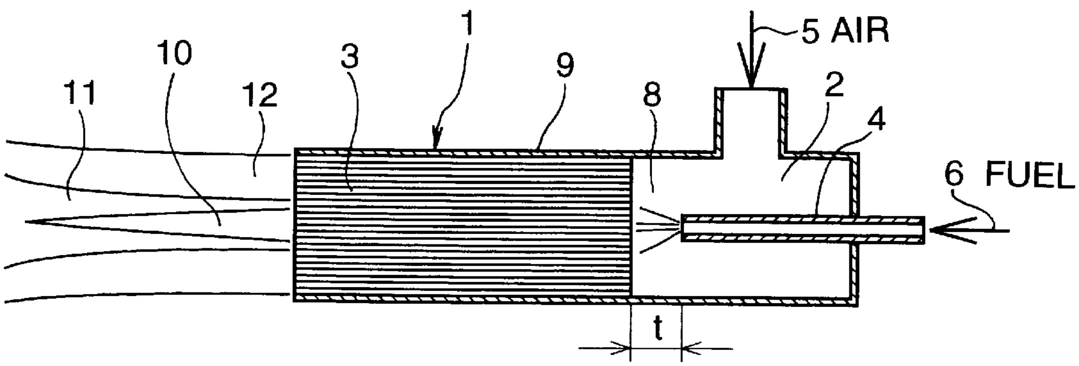
FIG. 5 is a cross-sectional view of a combustion apparatus according to a fifth embodiment of the present invention.

With a fifth embodiment of the present invention, as illustrated in FIG. 5, the gas passable solid 3 is of the straightener type, and the pre-mixture region 8 includes a space (having thickness t) defined between the upstream end of the gas passable solid 3 and the tip of the fuel injection nozzle 4.

Though FIG. 5 illustrates the fuel injection nozzle in the form of a pipe, the shape of the nozzle may vary. In this instance, a thickness of a wall of a pipe end, a diameter thereof, and a configuration are factors for controlling the pre-mixture characteristic. When the pipe wall thickness is thick, a turbulence is generated in the vicinity of the pipe end so that pre-mixture is promoted. When the difference between an air speed and a fuel speed is increased by changing the diameter of the pipe, turbulence generated at the boundary of the air layer and the fuel layer becomes strong so that pre-mixture is promoted. Further, by providing an end plate at the pipe end and forming a plurality of holes in the end plate or by forming a hold of a side of the pipe, pre-mixture is further promoted.

Due to this structure, a portion of the fuel gas 6 and a portion of the air for combustion 5 pre-mixes with each other in the pre-mixture region 8 to form a mixture. As a result, a cylindrical laminar flow having the fuel gas layer 10, the pre-mixture layer 11 outside the layer 10 and the air layer 12 outside the layer 11 is formed downstream of the solid 3. When the pre-mixture layer 11 is ignited, the combustion explained in the second embodiment of the present invention is conducted.

Figure 7:
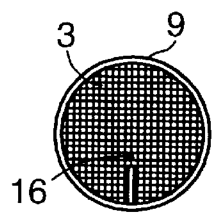
FIG. 7 is an elevational view of a combustion apparatus according to the sixth embodiment of the present invention.
Figure 6:
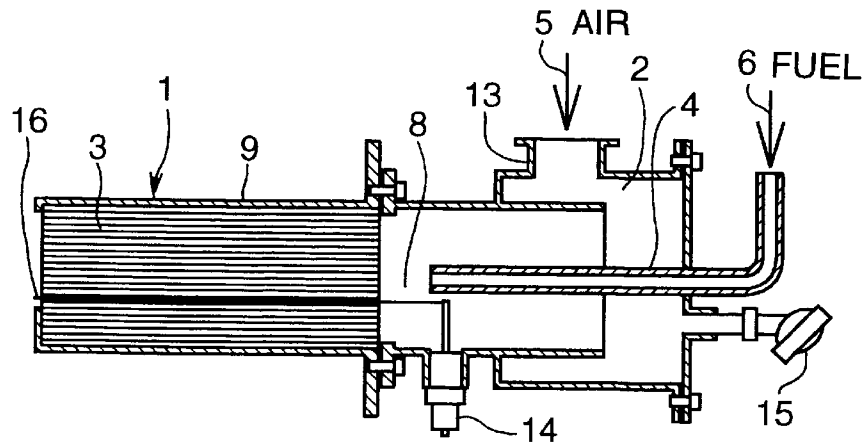
FIG. 6 is a cross-sectional view of a combustion apparatus according to a sixth embodiment of the present invention.

With a sixth embodiment of the present invention, as illustrated in FIGS. 6 and 7, the combustion apparatus including the burner 1 further includes a casing 9 supporting the gas passable solid 3 therein, an air header 13 coupled to the casing 9 and defining a portion of the gas passage 2 therein, an ignition device 14, and a detection device 15 for detecting a flame. The gas passable solid 3, the fuel injection nozzle 4, the casing 9, the ignition device 14, and the flame detecting device 15 are assembled to form a package. This package is detachably coupled to the furnace (or the tube).

With respect to the ignition device 14, it is possible to ignite the mixture by forming an electric discharge between the casing 9 which is electrically conductive and a spark rod 16 which penetrates the gas passable solid 3. Further, with respect to the flame detecting device 15, it is possible to detect a flame by using a flame rod which penetrates the gas passable solid 3 or by using an optical flame detecting device in a case where light can penetrate the solid 3.

Due to the package structure, detachability of the burner to the furnace or tube, and maintenance thereof are easy.

Figure 8:
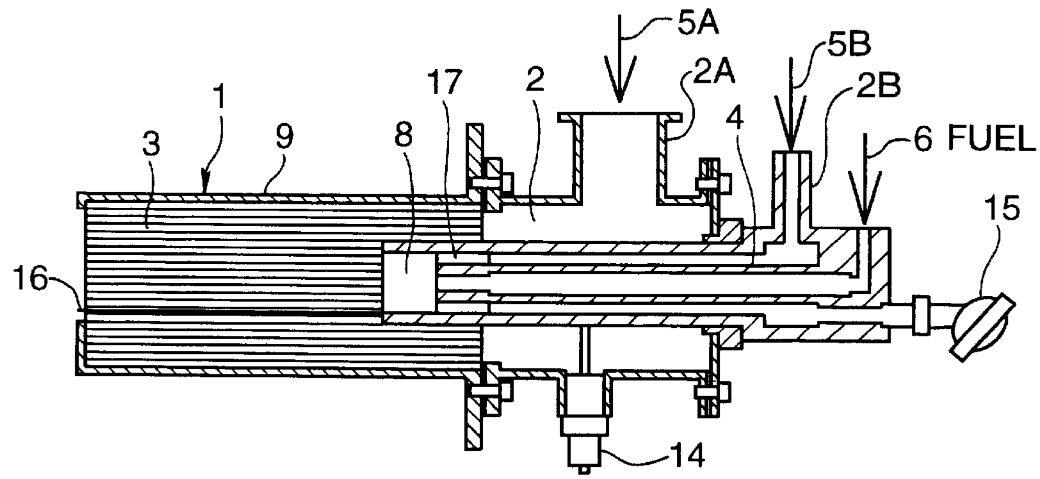
FIG. 8 is a cross-sectional view of a combustion apparatus according to a seventh embodiment of the present invention.

With seventh embodiment of the present invention, as illustrated in FIG. 8, the combustion apparatus provided with the burner 1 further includes a main air supply passage 2A for supplying main air for combustion 5A and a pilot air supply passage 2B for supplying pilot air for combustion 5B. The summation of the amount of the main air 5A and the amount of the pilot air 5B is equal to the amount of the air for combustion. The pilot air supply passage 2B and the main air supply passage 2A are independent of each other. The fuel injection nozzle 4 is disposed within the pilot air supply passage 2B therein contacts the gas passable solid 3. A tip of the fuel injection nozzle 4 is spaced apart from the surface of the solid through which the air for combustion enters the solid 3 so that a space defined between the tip of the fuel injection nozzle 4 and that surface of the solid defines the pre-mixture region 8.

To stably hold the fuel injection nozzle 4 within the pilot air supply passage 2B, the two pipes (the pipe for defining the pilot air supply passage 2B therein and the fuel injection nozzle 4) are spline-coupled or gear-coupled to each other so as to permit air to pass through the coupling portion, though the holding structure is not limited to that coupling structure. The reason why the tip of the pipe defining the pilot air supply passage therein contacts the solid 3 is to distinctly separate a range where the pilot air flows from a range where the main air flows in the gas passable solid 3. If necessary, a gasket may be inserted between the tip of the pipe and the solid, or the tip of the pipe defining the pilot air supply passage therein may be inserted into an intermediate portion of the gas passable solid of the straightener type.

By separating the pilot air flowing range from the main air flowing range, when the apparatus is used for a burner of a regenerative combustion system (wherein when the exhaust gas passes through the gas passable solid 3, the solid stores the heat of the exhaust gas, and when air for combustion passes through the solid, the solid releases the heat which the solid has stored to the air), a cylindrical low temperature region is formed in the solid so as to surround a core region where the fuel and the mixture of fuel and air flow, separating the core region from a peripheral region which is heated to a temperature above about 700° C. by the exhaust gas flowing through the peripheral region. As a result, it is possible to prevent the fuel and the mixture of the fuel and air from being burned to melt the solid 3. Due to that structure for separating the pilot air flow region from the main air flow region, it becomes practical to apply the apparatus to the regenerative combustion burner.

Figure 9:
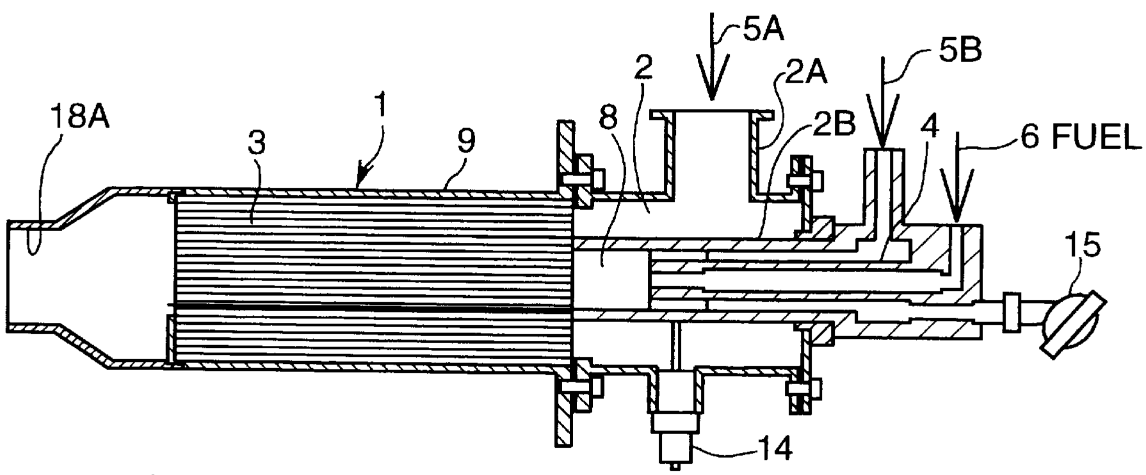
FIG. 9 is a cross-sectional view of a combustion apparatus according to an eighth embodiment of the present invention in a case where the apparatus has a high velocity port.
Figure 11:
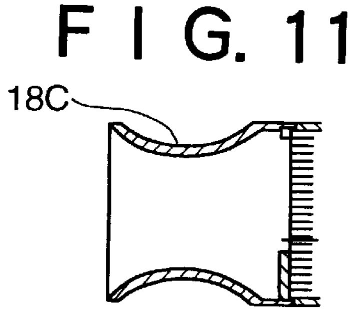
FIG. 11 is a cross-sectional view of a combustion apparatus according to an eighth embodiment of the present invention in a case where the apparatus has a low pressure loss port.
Figure 10:
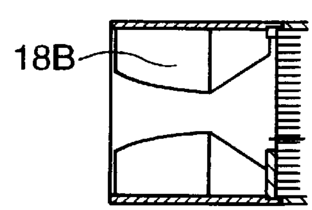
FIG. 10 is a cross-sectional view of a combustion apparatus according to an eighth embodiment of the present invention in a case where the apparatus has a swirl generation port.

With an eighth embodiment of the present invention, as illustrated in FIGS. 9, 10 and 11, the apparatus provided with the burner 1 further includes a port defining member 18A, 18B or 18C disposed on the flame formation side of the gas passable solid 3.

The port defining member 18A of FIG. 9 includes an exit reduced in a transverse cross-sectional area thereof for increasing the speed of gas. This port may be called a high speed port. The port defining member 18B of FIG. 10 includes a vane for generating a swirl flow. The port defining member 18C is formed in the form of a venturi and is called a low pressure loss port.

By selecting the kind of port, a desirable flow characteristic of the port is obtained.

Figure 12:
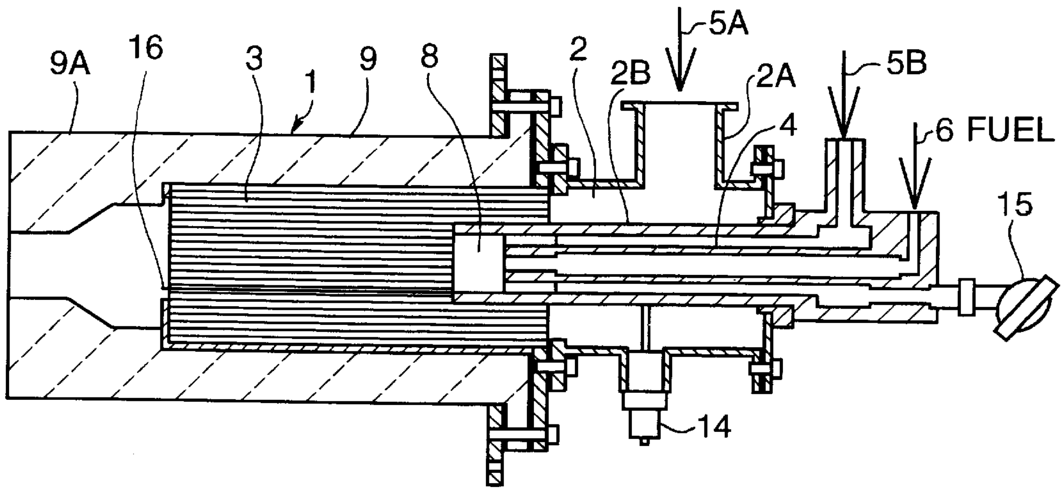
FIG. 12 is a cross-sectional view of a combustion apparatus according to a ninth embodiment of the present invention.

With a ninth embodiment of the present invention of the present invention, as illustrated in FIG. 12, the apparatus provided with the burner 1 includes a casing 9 housing the gas passable solid 3 therein. The casing 9 includes a port defining portion 9A for forming a port of a desirable configuration. At least a portion of the casing 9 (the entire portion of the casing in the embodiment shown) is made from refractory. The port defining portion 9A is of a high speed port having an exit reduced in diameter. The refractory is, for example, ceramic. In this instance, a local conductive portion (spark rod) to be disposed on the downstream side of the air passage may be made from heat-resistant metal, or the entire portion of the casing may be made from ceramics by using electrically conductive ceramics so that the casing can endure a higher temperature.

In the case where the casing 9 is made form refractory and the casing 9 is disposed in the furnace, the heat-resistance characteristic of the combustion apparatus can be improved.

Figure 13:
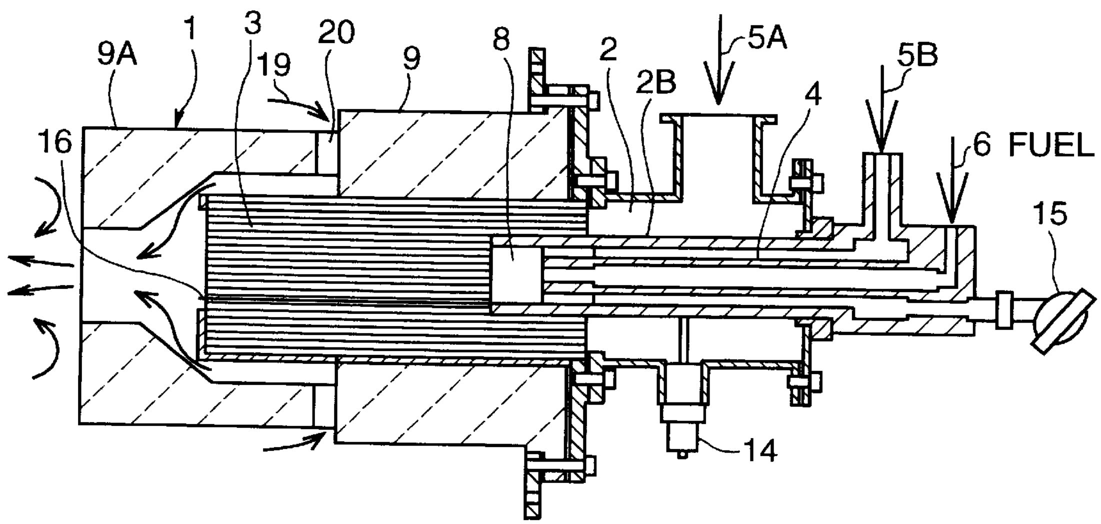
FIG. 13 is a cross-sectional view of a combustion apparatus according to a tenth embodiment of the present invention.

With a tenth embodiment of the present invention, as illustrated in FIG. 13, the burner 1 includes a casing 9 supporting the gas passable solid 3 therein. The casing 9 has a gas introduction hole 20 formed therein for causing fuel burnt gas to pass through the hole 20 to air for combustion inside the casing 9 due to a negative pressure generated inside the casing 9 by the air expelled from the downstream end of the gas passable solid 3.

Due to this structure, the air for combustion and the exhaust gas in the furnace mix with each other so that combustion is slack whereby generation of NOx is suppressed.

Further, by using both the gas introduction hole 20 and the high speed port, self-recirculation of the exhaust gas in the furnace is strongly conducted even at a flame formation region so that generation of NOx is further suppressed.

Figure 14:
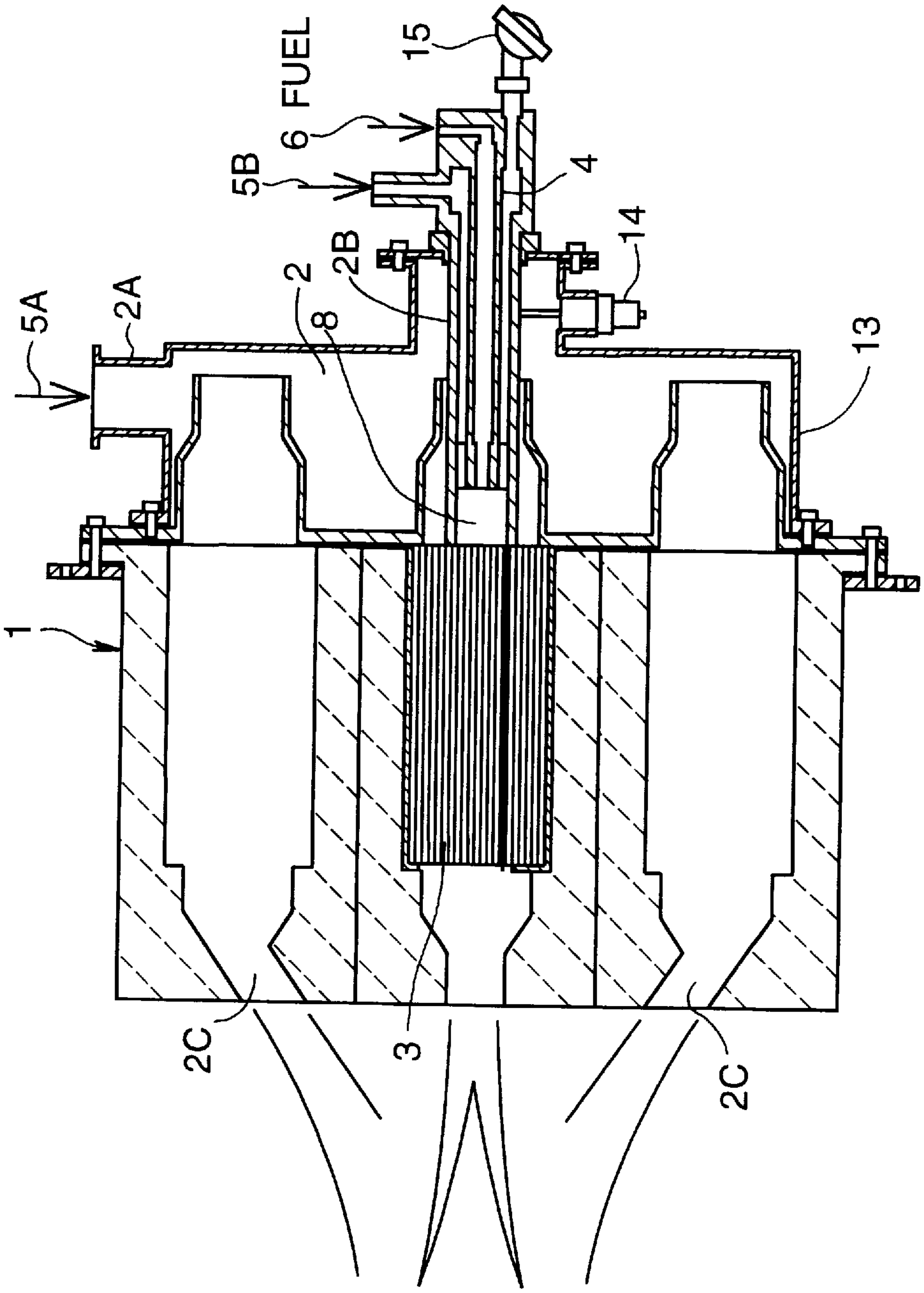
FIG. 14 is a cross-sectional view of a combustion apparatus according to an eleventh embodiment of the present invention.
Figure 15:
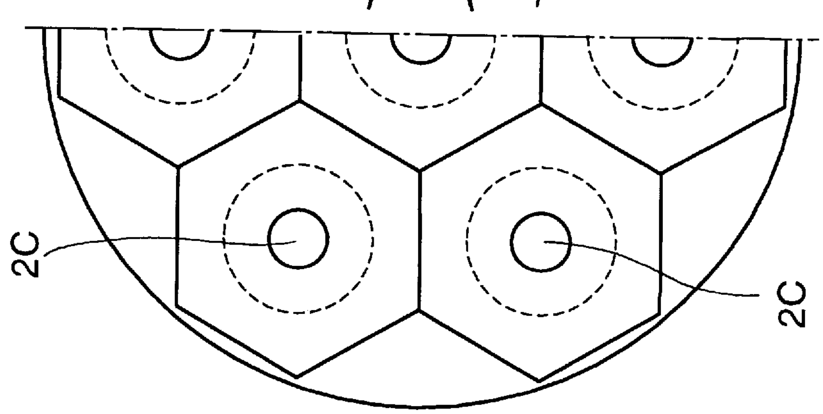
FIG. 15 is a side elevational view of a combustion apparatus according to the eleventh embodiment of the present invention.

With an eleventh embodiment of the present invention, as illustrated in FIGS. 14 and 15, the apparatus provided with the burner 1 further includes a main air supply passage 2A for supplying main air for combustion 5A and a pilot air supply passage 2B for supplying pilot air for combustion 5B. The pilot air supply passage 2B and the main air supply passage 2A are independent of each other. The fuel injection nozzle 4 is disposed within the pilot air supply passage 2B. A tip of the pipe defining the pilot air supply passage 2B therein contacts the gas passable solid 3. A tip of the fuel injection nozzle 4 is spaced apart from the surface of the solid through which the air for combustion enters the solid 3 so that a space defined between the tip of the fuel injection nozzle 4 and that surface of the solid defines the pre-mixture region 8.

The ratio of fuel 6 supplied from the fuel injection nozzle 4 to air for combustion supplied from the main air supply passage 2A and the pilot air supply passage 2B is intentionally set to be at a fuel excess.

The apparatus further includes a third air passage 2C for supplying air for combustion to a downstream of the gas passable solid 3 independently of the main air passage 2A and the pilot air passage 2B.

The burner 1 is a multi-port burner having a central port and a plurality of ports surrounding the central port. The surrounding ports constitute the third air passage 2C. Air may be supplied through the passage 2C driven by a negative pressure generated by the flow of pilot flame, a natural air supply system utilizing an exhaust fan, or a blower for compulsorily supplying air for combustion.

Due to the above-described structure, by conducting combustion under the intentional fuel excess condition, the combustible region functions as a pilot flame, and an excess fuel forms a main flame cooperating with the air supplied through the third air supply passage 2C.

With a twelfth embodiment of the present invention, as illustrated in FIGS. 16 and 17, the apparatus provided with the burner I further includes a main air supply passage 2A for supplying main air for combustion 5A and a pilot air supply passage 2B for supplying pilot air for combustion 5B. The pilot air supply passage 2B and the main air supply passage 2A are independent of each other. The fuel injection nozzle 4 is disposed within the pilot air supply passage 2B. A tip of the pipe defining the pilot air supply passage 2B therein contacts the gas passable solid 3. A tip of the fuel injection nozzle 4 is spaced apart from the surface of the solid through which the air for combustion enters the solid 3 so that a space defined between the tip of the fuel injection nozzle 4 and that surface of the solid defines the pre-mixture region 8.

The ratio of fuel 6 supplied from the fuel injection nozzle 4 to air for combustion supplied from the main air supply passage 2A and the pilot air supply passage 2B is intentionally set to be at an air excess.

The apparatus further includes a second fuel passage 4A for supplying secondary fuel 6A (which can be either the same kind of fuel as or a different kind of fuel from the fuel supplied from the fuel injection nozzle 4, or appropriately atomized liquid or powder fuel) to a downstream of the gas passable solid 3 independently of the fuel injection nozzle 4.

Due to the above-described structure, by conducting combustion under the intentional air excess condition, the combustible region functions as a pilot flame, and an excess air forms a main flame cooperating with the fuel supplied through the second fuel supply passage 4A.

Figure 18:
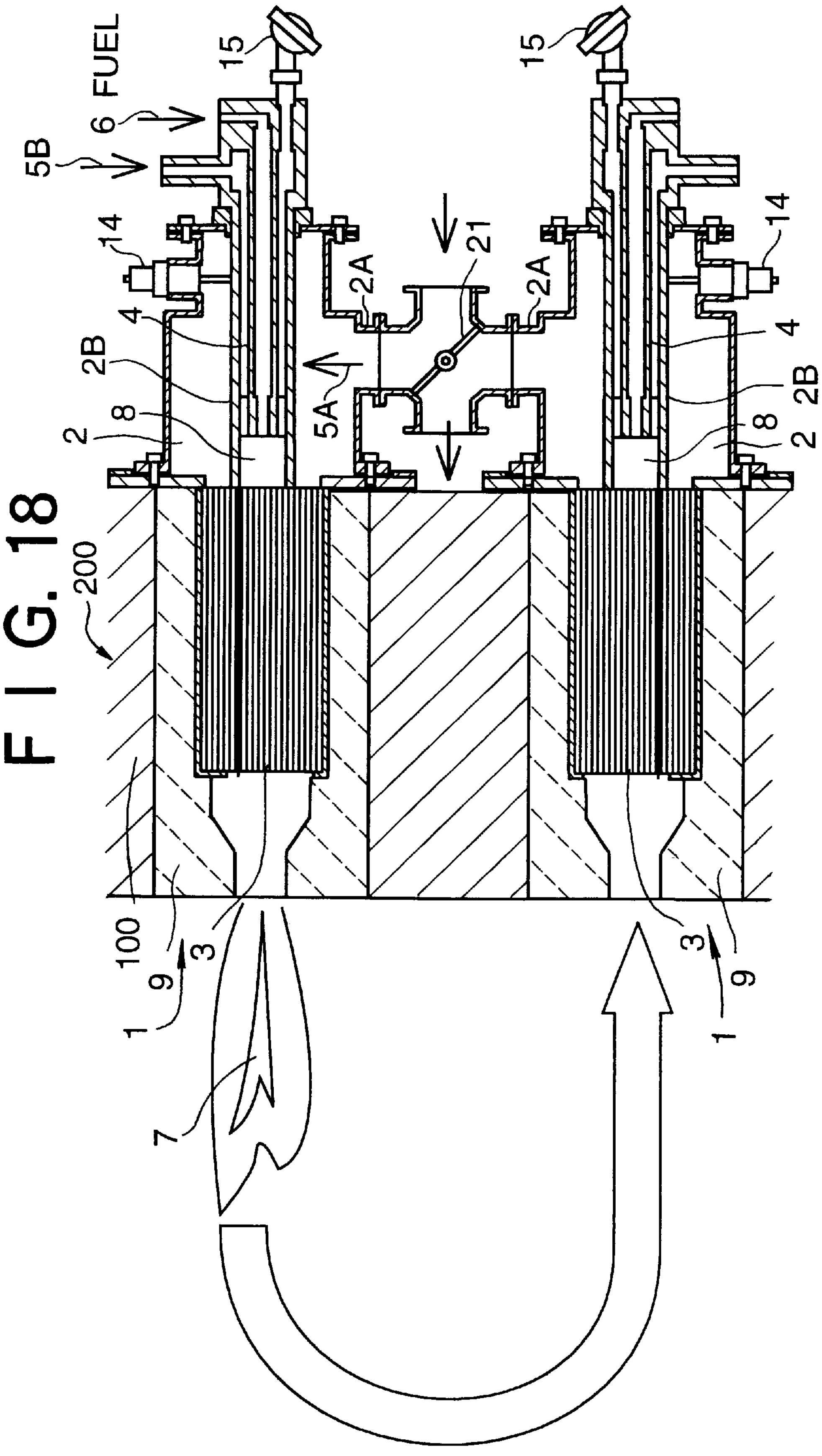
FIG. 18 is a cross-sectional view of a combustion apparatus according to a thirteenth embodiment of the present invention.

With a thirteenth embodiment of the present invention, as illustrated in FIG. 18, two of the burners 1 having the same structure as explained in the seventh embodiment are provided. The two burners are paired and correlated with each other so that when one of the two burners is conducting combustion, the other of the two burners is stopping combustion and so that the combustion stopping burner causes exhaust gas to pass therethrough thereby storing heat of the exhaust gas in a gas passable solid 3 of the combustion stopping burner and the combustion conducting burner causes air for combustion to pass therethrough thereby releasing the heat which a gas passable solid 3 of the combustion conducting burner has stored to the air for combustion. A switching mechanism 21 for switching air supply and gas exhaust is provided outside the two burners 1. The switching mechanism 21 is, for example, a four port valve. Two ports opposed to each other of the valve are connected to respective air supply ports of the two burners 1, and one of the remaining two ports is connected to an air source and the other of the remaining two ports is connected to an exhaust fan.

Due to this structure, the two burners 1 constitute a regenerative combustion switching type twin burner system. In the system, the gas passable solid 3 is of the straightener type and functions as a heat storage member.

Due to the above-described structure, the same effect and advantage as explained in the second embodiment of the present invention are obtained. More particularly, the slack combustion within the cylindrical exhaust gas layer is conducted. Due to the laminar flow, the flame is axially elongated and the combustion is slack. Further, the flame is brilliant, which is unique to combustion of carbon.

Due to the slack combustion, generation of NOx is suppressed, so that the amount of NOx contained in the fuel-burnt gas exhausted from the combustion apparatus to the atmosphere is decreased. This means that the combustion is clean and friendly to the environment. Further, due to the slack combustion and provision of a cylindrical air layer of a low temperature surrounding the burning cylindrical mixture layer, a portion of the apparatus adjacent to the downstream end of the solid is prevented from locally overheating, and durability of the apparatus is improved. Further, due to the slack combustion and the elongated flame, a heat flux becomes flat in the axial direction of the apparatus so that the heating is uniform and the temperature of the interior of the furnace or the tube can be raised to an allowable limit throughout all portions of the furnace or the tube resulting in improvement of the heat transmittance efficiency.

Further, the same effect and advantage as explained in the seventh embodiment of the present invention are obtained. More particularly, by separating the pilot air flowing range from the main air flowing range, when the apparatus is used for a burner of a regenerative combustion system, a cylindrical low temperature region is formed in the solid so as to surround a core region where the fuel and the mixture of fuel and air flow, separating the core region from a peripheral region which is heated to a temperature above about 700° C. by the exhaust gas flowing through the peripheral region. As a result, it is possible to prevent the fuel and the mixture of fuel and air from being burned to melt the solid 3. Due to that structure for separating the pilot air flow region from the main air flow region, it becomes practical to apply the apparatus to the regenerative combustion burner (including a radiant tube burner).

Figure 19:
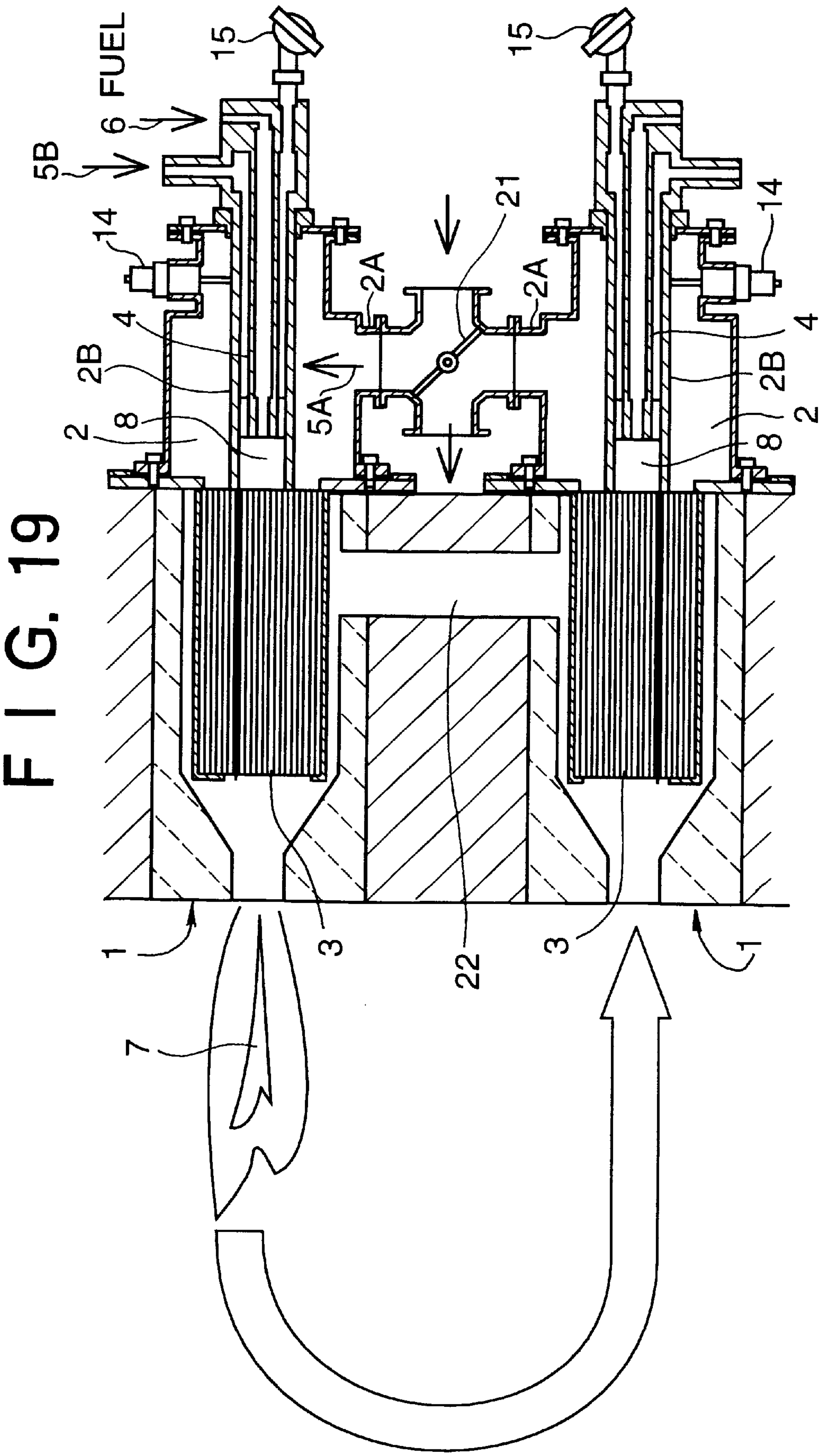
FIG. 19 is a cross-sectional view of a combustion apparatus according to a fourteenth embodiment of the present invention.

With a fourteenth embodiment of the present invention, as illustrated in FIG. 19, a communicating passage 22 is provided between the two burners 1 of the thirteenth embodiment of the present invention, for enabling a portion of the exhaust gas to recirculate from a combustion stopping burner to a combustion conducting burner. The gas recirculation is conducted utilizing a negative pressure generated around the gas passable solid 3 and induced by the air flowing out from the downstream end of the solid.

Due to this structure a portion of the fuel-burnt gas in the furnace or tube is recirculated to the burner to mix with the air for combustion, thereby making the combustion further slack.

Figure 20:
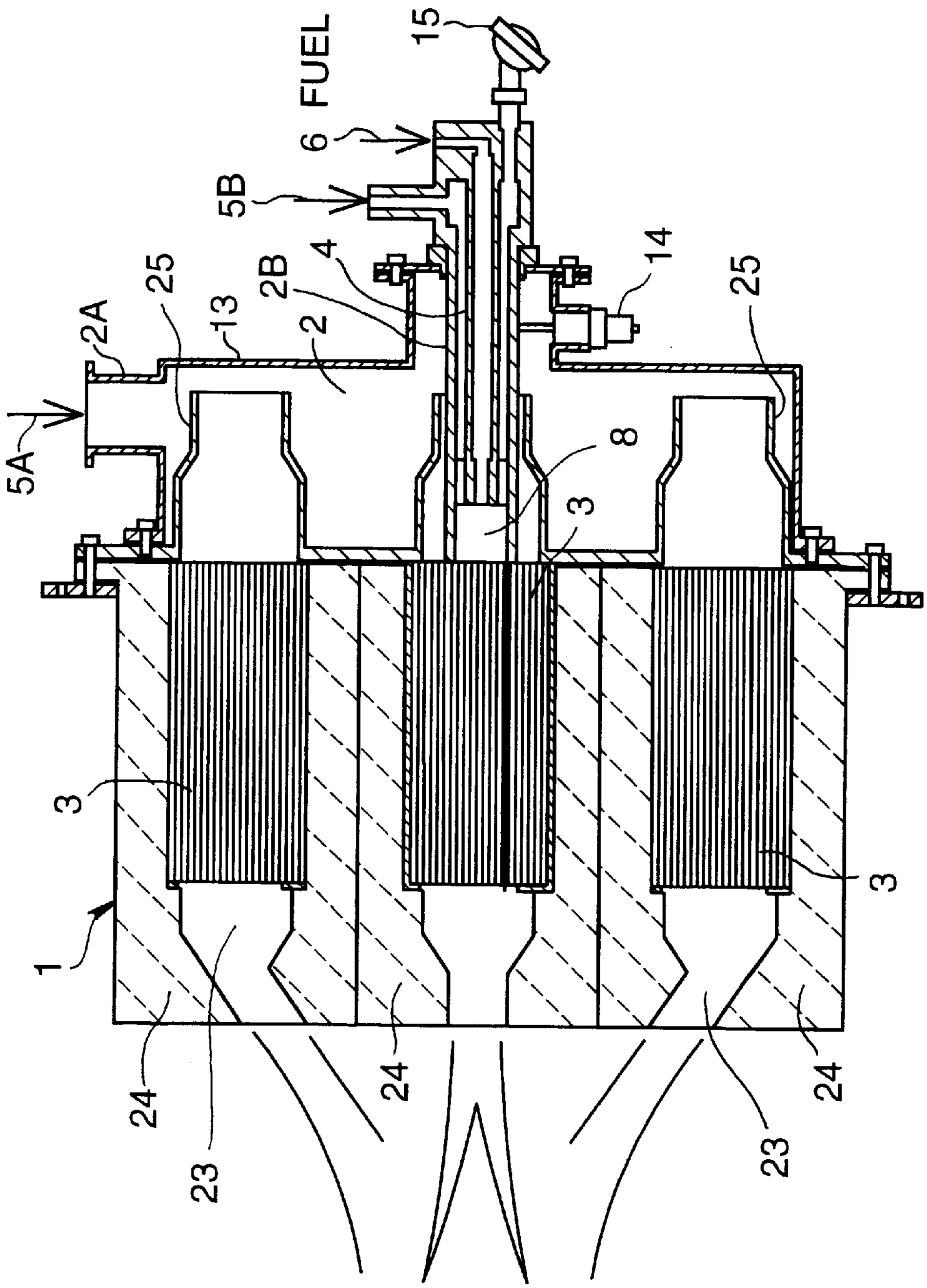
FIG. 20 is a cross-sectional view of a combustion apparatus according to a fifteenth embodiment of the present invention.
Figure 21:
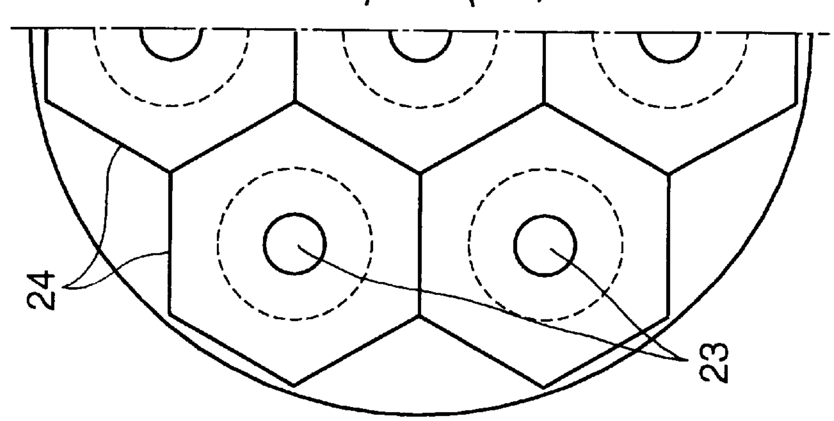
FIG. 21 is a side elevational view of a combustion apparatus according to the fifteenth embodiment of the present invention.

With a fifteenth embodiment of the present invention, as illustrated in FIGS. 20 and 21, each of the burners 1 of the apparatus described in the thirteenth embodiment of the present invention includes a multi-port type burner having a plurality of (for example, seven) ports 23. Each port 23 is formed in a refractory block 24 having a hexagonal cross-section. The gas passable solid 3 is disposed within all of the ports 23, and the fuel injection nozzle 4 is provided only in the region of some or one of the plurality of ports (for example, only the central port).

Due to this structure, by combining a plurality of the hexagonal refractory blocks 24, enlargement to a relatively large system is possible. Further, by providing a pipe 25 in the air header, it is possible to make the flow of air in all of the ports uniform.

Figure 22:
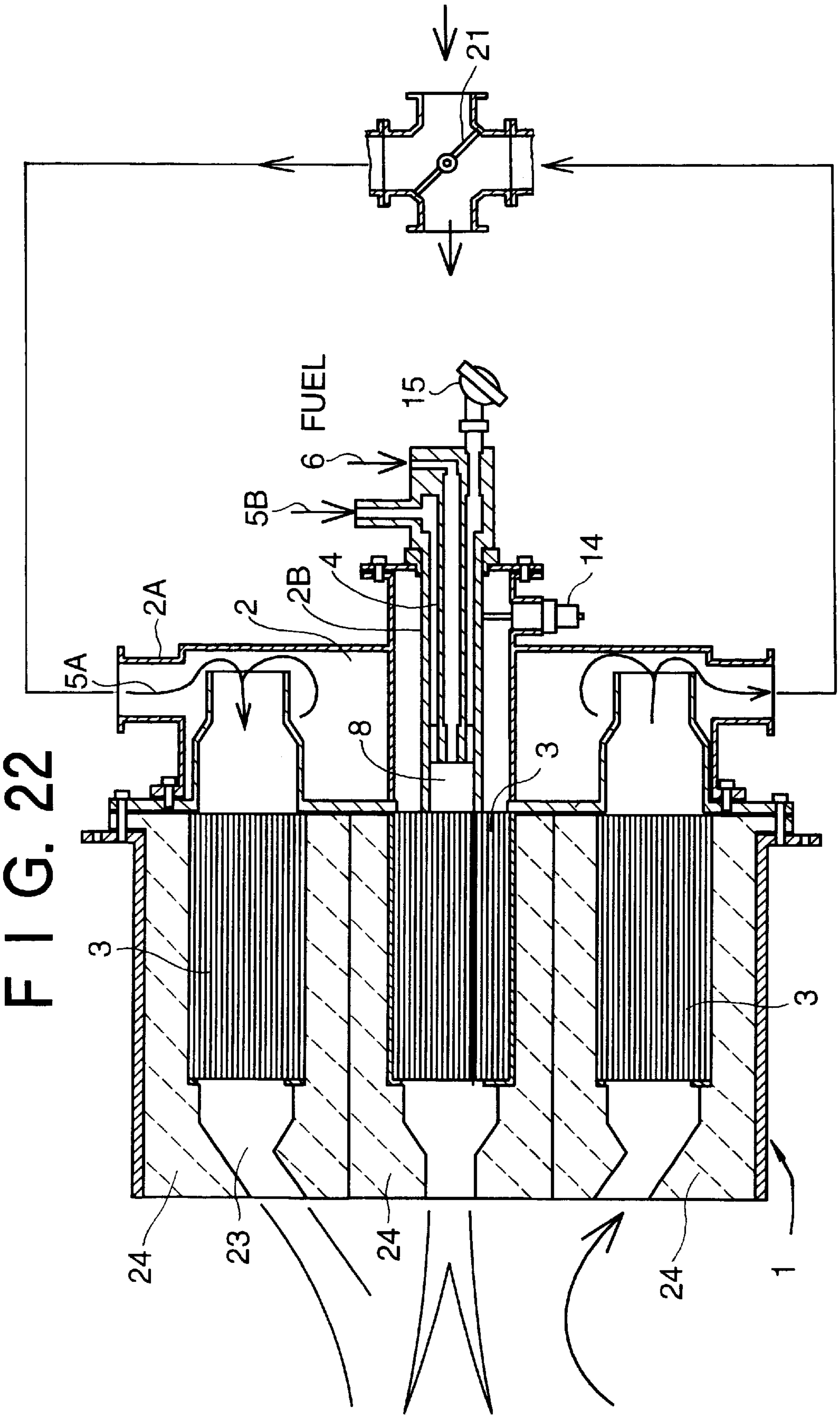
FIG. 22 is a cross-sectional view of a combustion apparatus according to a sixteenth embodiment of the present invention.
Figure 23:
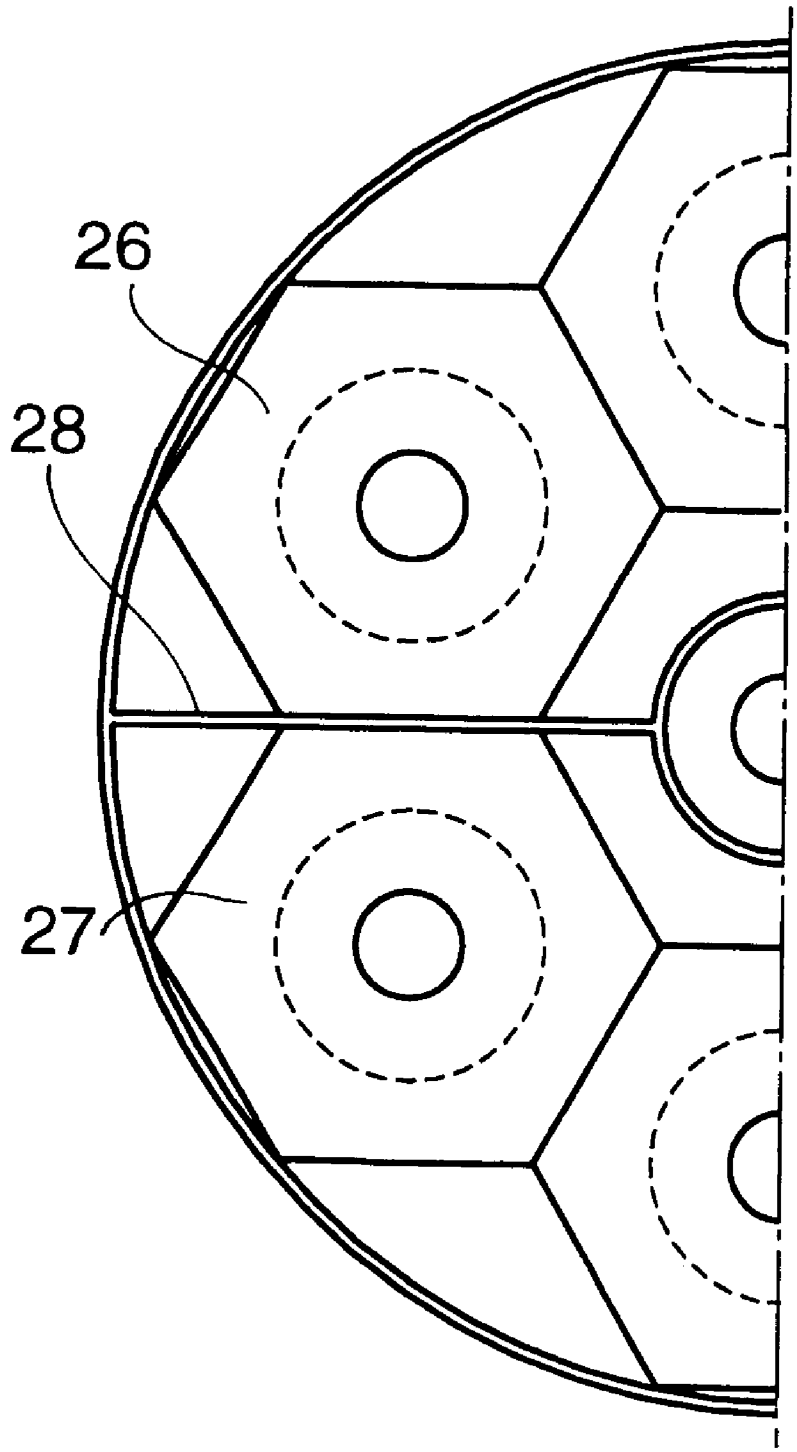
FIG. 23 is a side elevational view of a combustion apparatus according to the sixteenth embodiment of the present invention.

With a sixteenth embodiment of the present invention, as illustrated in FIGS. 22 and 23, the apparatus is provided with a single burner 1. The single burner includes a multi-port type burner having a plurality of (for example, seven) ports 23. Each port 23 is formed in the refractory block 24 having a hexagonal cross-section. The gas passable solid 3 is disposed in each of the plurality of ports 23 of the single burner 1. The fuel injection nozzle 4 is disposed in at least one but not all of the plurality of ports 23 of the single burner 1. The fuel injection nozzle 4 is disposed, for example, only in the central block. The ports of the single burner 1, except for the at least one port in which the fuel injection nozzle 4 is disposed, are divided by a partition 28 into two groups 26 and 27 which are correlated with each other so that when air for combustion is flowing through ports in one of the two groups, exhaust gas is flowing through ports in the other of the two groups. In addition, the ports in the other group cause exhaust gas to pass therethrough thereby storing heat of the exhaust gas in a gas passable solid 3 of each of the ports in the other group and ports in the one group of the two burners causes air for combustion to pass therethrough thereby releasing the heat which the gas passable solid 3 of each of the ports of the one of the two groups has stored to the air for combustion.

The combustion apparatus further includes a switching mechanism (not shown, but similar to the switching mechanism 21 of FIG. 18) for switching air supply to and gas exhaust from the two groups 26 and 27. The switching mechanism is provided outside the single burner 1.

This structure constitutes a multi-port type and alternatively switching-type regenerative combustion single burner.

Due to this structure, the exhaust port is located adjacent the exit ports of the air for combustion so that stronger recirculation of the exhaust gas is conducted to the air for combustion in the furnace than that of the conventional paired burners for regenerative combustion. As a result, generation of NOx is more strongly suppressed.

Figure 24:
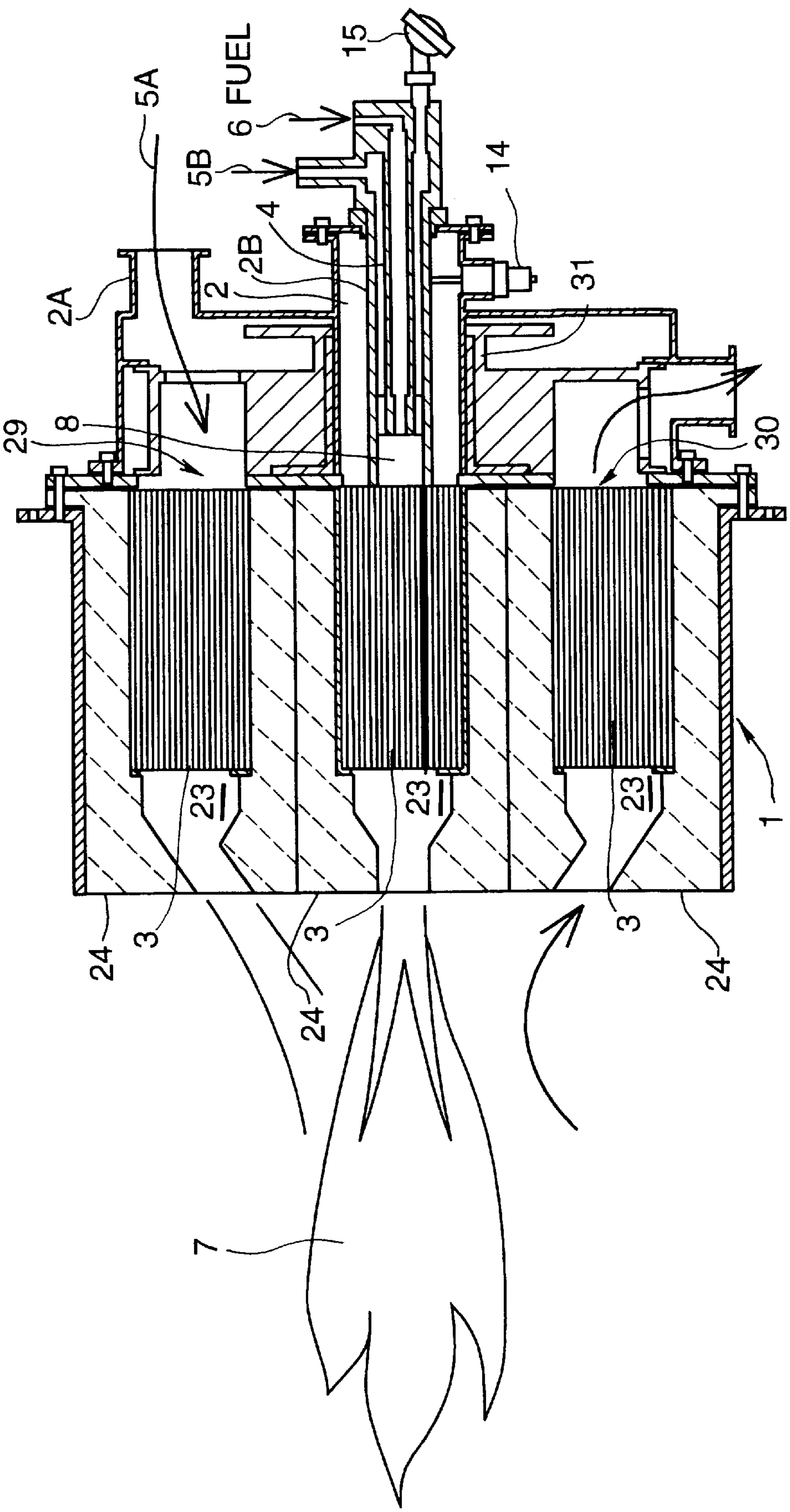
FIG. 24 is a cross-sectional view of a combustion apparatus according to a seventeenth embodiment of the present invention.

With a seventeenth embodiment of the present invention, as illustrated in FIG. 24, the apparatus is provided with a single burner 1. The single burner includes a multi-port type burner having a plurality of (for example, seven) ports 23. Each port 23 is formed in the refractory block 24 having a hexagonal cross-section. The gas passable solid 3 is disposed in each of the plurality of ports 23 of the single burner 1. The fuel injection nozzle 4 is disposed in at least one but not all of the plurality of ports 23 of the single burner 1. The fuel injection nozzle 4 is disposed, for example, only in the central block.

The ports of the single burner 1, except for the at least one port in which the fuel injection nozzle 4 is disposed, are divided into two groups 29 and 30 which are correlated with each other so that when air for combustion is flowing through ports in one of the two groups, exhaust gas is flowing through ports in the other of the two groups and so that the ports in the other group cause exhaust gas to pass therethrough thereby storing heat of the exhaust gas in a gas passable solid 3 of each of the ports in the other group and the ports in the one group of the two burners causes air for combustion to pass therethrough thereby releasing the heat which the gas passable solid 3 of each of the ports of the one of the two groups has stored to the air for combustion.

The combustion apparatus further includes a switching mechanism 31 of a rotary type for switching air supply to and gas exhaust from the two groups 29 and 30. The switching mechanism 31 is disposed within the single burner 1.

This structure constitutes a multi-port type and rotary switching-type regenerative combustion single burner.

Due to this structure, the exhaust port is located adjacent the exit ports of the air for combustion so that stronger recirculation of the exhaust gas is conducted to the air for combustion in the furnace than that of the conventional paired burners for regenerative combustion. As result, generation of NOx is more strongly suppressed.

Figure 25:
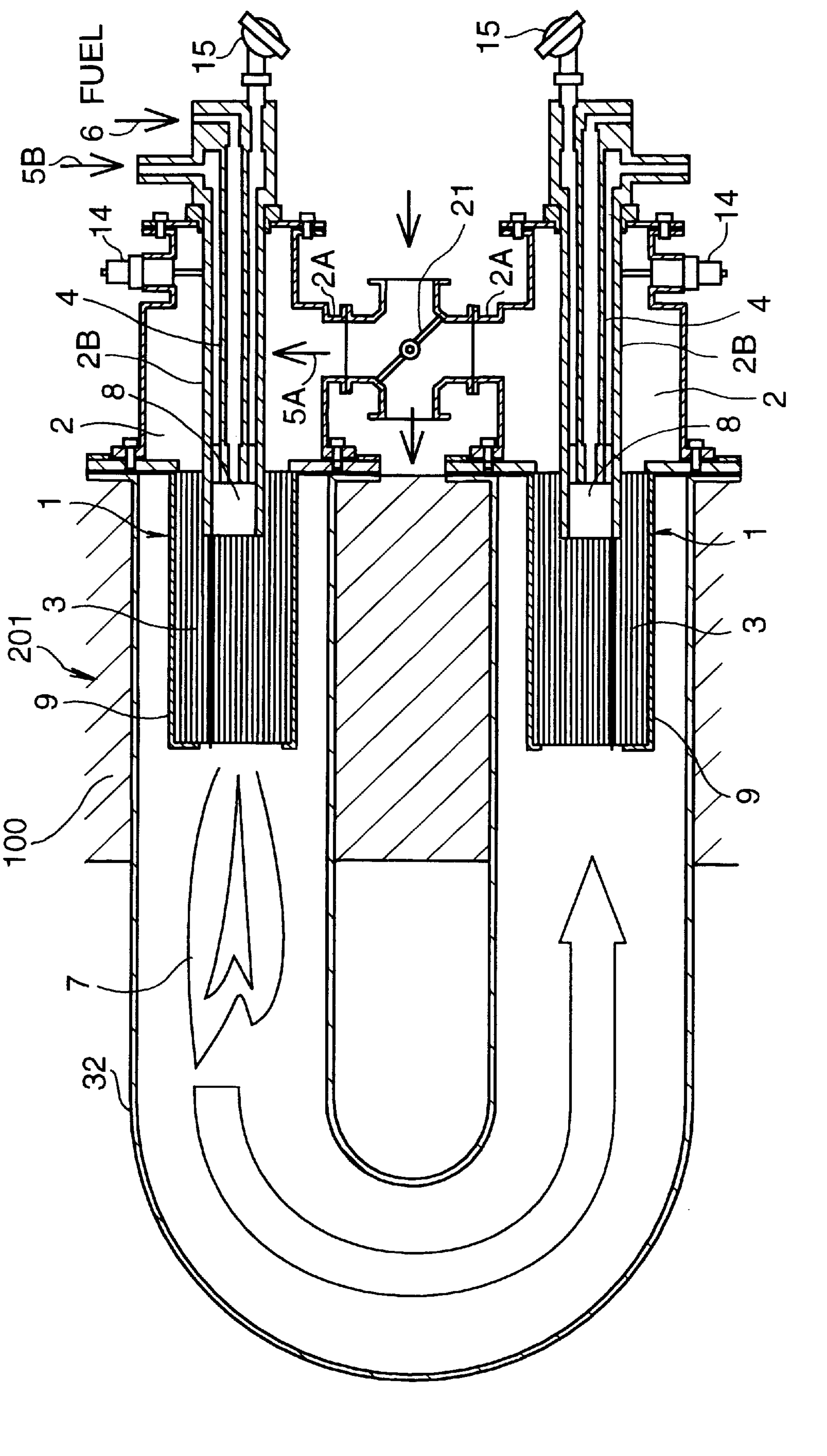
FIG. 25 is a cross-sectional view of a combustion apparatus according to an eighteenth embodiment of the present invention.

With an eighteenth embodiment of the present invention, as illustrated in FIG. 25, the combustion apparatus is provided with two burners 1. One of the two burners is provided at one end of a radiant tube 32 defining a combustion chamber therein, and the other of the two burners is provided at the other end of the radiant tube 32.

The two burners 1 are correlated with each other so that when one of the two burners is conducting combustion, the other of the two burners is stopping combustion and so that said combustion stopping burner causes exhaust gas to pass therethrough thereby storing heat of the exhaust gas in a gas passable solid 3 of the combustion stopping burner and the combustion conducting burner causes air for combustion to pass therethrough thereby releasing the heat which the gas passable solid 3 of the combustion conducting burner has stored to the air for combustion. The two burners further include a switching mechanism 21 for switching air supply and gas exhaust connected to the two burners.

The combustion apparatus provided with the burner 1, as described in the seventh embodiment of the present invention, further includes a main air supply passage 2A for supplying main air for combustion 5A and a pilot air supply passage 2B for supplying pilot air for combustion 5B. The pilot air supply passage 2B and the main air supply passage 2A are independent of each other. The fuel injection nozzle 4 is disposed within the pilot air supply passage 2B. A tip of the pipe defining the pilot air supply passage 2B therein contacts the gas passable solid 3. A tip of the fuel injection nozzle 4 is spaced apart from the surface of the solid through which the air for combustion enters the solid 3 so that a space defined between the tip of the fuel injection nozzle 4 and that surface of the solid defines the pre-mixture region 8. The gas passable solid 3 is of the straightener type.

The above-described structure constitutes an alternatively switching type and regenerative combustion type radiant tube burner.

Figure 26:
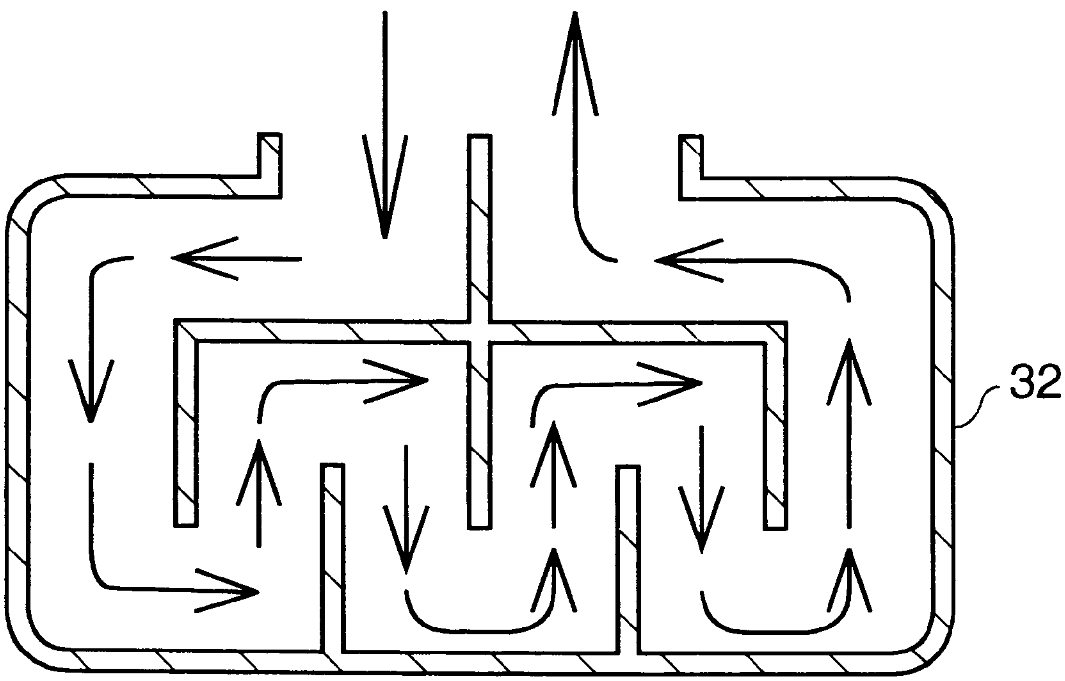
FIG. 26 is a front elevational view of a combustion apparatus of a panel type according to the eighteenth embodiment of the present invention.

A material of the radiant tube 32 may be any material provided that the material is of heat-proof and shock-proof and stable against chemicals, for example, metals and ceramics. The radiant tube 32 may be configured in the form of U, I, or W letter or to be spiral. The shape of a transverse cross-section of the radiant tube 32 may be circular, oval or rectangular. Further, the tube is not limited to a pipe, and may be a passage formed by partitioning an interior of a box, as shown in FIG. 26.

A method for supplying air for combustion may be of an air feed type where an air supply source is connected to an air supply port of a switching mechanism (a four port valve) 21 or of an air suctioning type where an exhaust fan is connected to a gas exhaust port of the switching mechanism.

FIG. 25 illustrates a case where a four port valve is used as the switching mechanism 21. Two ports opposed to each other of the four port valve are connected to the air supply ports of the two burners. One of the remaining two ports of the four port valve is connected to an air supply source and the other of the remaining ports is connected to the exhaust fan.

Due to the above-described structure, the same effect and advantage as explained in the second embodiment of the present invention are obtained. More particularly, the combustion is conducted slackly, and the flame is elongated in the axial direction. In the combustion, the flame is brilliant and elongated.

Due to the slack combustion, generation of NOx is suppressed, so that the amount of NOx contained in the fuel burnt gas exhausted from the combustion apparatus to the atmosphere is decreased. This means that the combustion is clean and friendly to the environment. Further, due to the slack combustion and provision of a cylindrical air layer of a low temperature surrounding the burning cylindrical mixture layer, a portion of the tube adjacent to the downstream end of the solid is prevented from locally overheating, and durability of the tube is improved. Further, due to the slack combustion and the elongated flame, a heat flux becomes flat in the axial direction of the tube 32 so that the heating is uniform and the temperature of the interior of the tube 32 can be raised to an allowable limit throughout all portions of the tube resulting in improvement of the heat transmittance efficiency.

Further, the same effect and advantage as described in the seventh embodiment of the present invention are obtained. More particularly, by separating the pilot air flowing range from the main air flowing range, a cylindrical low temperature region is formed in the solid so as to surround a core region where the fuel and the mixture of fuel and air flow, thereby separating the core region from a peripheral region which is heated to a temperature above about 700° C. by the exhaust gas flowing the peripheral region. As a result, it is possible to prevent the fuel and the mixture of fuel and air from being burned to melt the solid 3.

Figure 27:
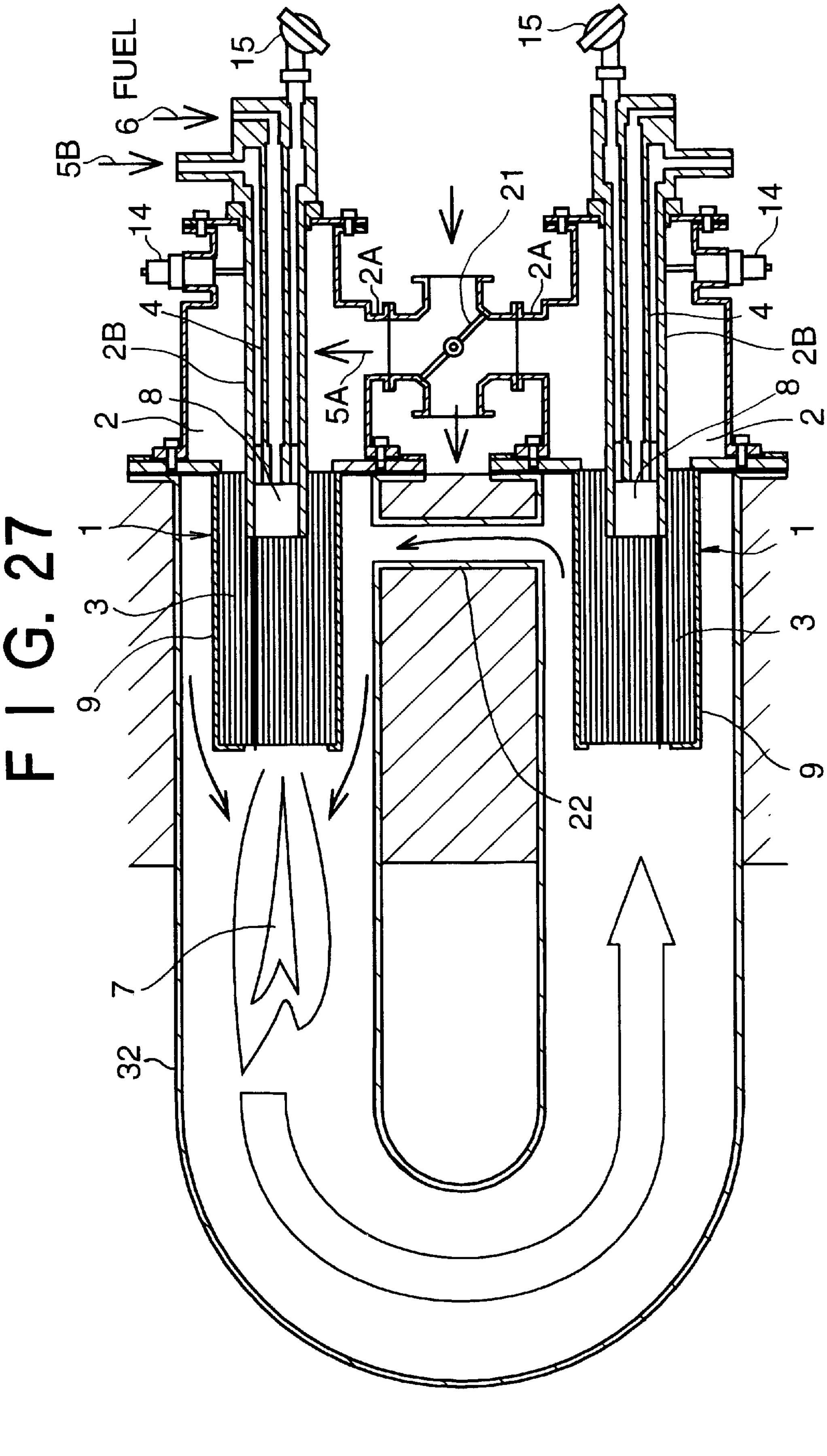
FIG. 27 is a cross-sectional view of a combustion apparatus according to a nineteenth embodiment of the present invention.

With the nineteenth embodiment of the present invention, as illustrated in FIG. 27, the combustion apparatus is provided with two burners like the eighteenth embodiment of the present invention. A communicating passage 22 is provided between the two burners 1 which enables a portion of exhaust gas to recirculate from a combustion stopping burner to a combustion conducting burner. The recirculation is conducted by utilizing a negative pressure generated around the gas passable solid 3 when induced by air flowing out from the downstream end of the gas passable solid 3.

Due to this structure, a portion of the burnt gas in the radiant tube is recirculated to the burner 1 to mix with the air for combustion so that combustion is slack.

The apparatus provided with the burner 1 according to the thirteenth to seventeenth embodiments of the present invention is coupled to various kinds of furnaces 100 (see FIG. 18), a boiler, and chemical reaction containers or vessels, to constitute direct heat type thermal facilities 200.

The apparatus provided with the burner 1 according to the eighteenth and nineteenth embodiments of the present invention is coupled to various kinds of furnaces 100 (see FIG. 25), a boiler, and chemical reaction containers or vessels, to constitute indirect heat type thermal facilities 201.

The above-described various kinds of furnaces 100 include a melting furnace, a sintering furnace, a preheating furnace, a soaking pit, a forging furnace, a heating furnace, an annealing furnace, a solution annealing furnace, a plating furnace, a drying furnace, a heat treatment furnace, a heating furnace for quenching, a tempering furnace, an oxidizing and reducing furnace, a kiln, a baking furnace, a roasting furnace, a molten metal holding furnace, a fore hearth, a crucible furnace, a homogenizing furnace, an aging furnace, a reaction promoting furnace, a distilling furnace, a ladle dry preheating furnace, a mold preheating furnace, a normalizing furnace, a brazing furnace, a carburizing furnace, an oven for drying paint, a holding furnace, a nitriding furnace, a salt bath furnace, a glass melting furnace, boilers including a boiler for electric power generation, incinerators including an incinerator for burning garbage, and a hot water supply apparatus.

According to the present invention, the following technical advantages are obtained:

First, since the fuel injection nozzle is disposed rearward of the gas passable solid, the mechanism portion including the fuel injection nozzle can be located at a low temperature portion of the apparatus. As a result, durability of the apparatus is improved.

Second, in the case where the gas passable solid is of the straightener type, a laminar combustion is conducted. As a result, the combustion is slack and the flame is prolonged. Further, generation of NOx is suppressed, and the temperature distribution is flat so that local over heating of the furnace or tube is prevented and the heat transfer efficiency is improved.

Third, in the case with the pre-mixture regions, a cylindrical layer of the mixture is formed in front of the downstream end of the gas passable solid, a laminar boundary combustion is conducted and ignition is smooth.

Fourth, in the case where the members are assembled in the form of a package, coupling the apparatus to the furnace or tube and decoupling thereof are easy.

Fifth, in the case where the main air passage and the pilot air passage are independent of each other, a cylindrical pilot air flow region at a low temperature is formed around the fuel gas flow region. As a result, the fuel gas flow region is separated by the pilot air flow from the exhaust gas at a high temperature, so that the fuel and the mixture of fuel and air are prevented from self-ignition and the gas passable solid is prevented from melting.

Sixth, the configuration of the port can be selected to a desirable one.

Seventh, by making the casing from refractory, durability of the apparatus is improved.

Eighth, by causing a portion of the exhaust gas to recirculate, generation of NOx is suppressed.

Ninth, by adopting the multi-port structure, the apparatus can be applied to even a facility of a large size.

Last, by providing the apparatus to each of opposite ends of a tube, the apparatus can be applied to a radiant tube combustion system.

Although the present invention has been described with reference to specific exemplary embodiments, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A combustion apparatus provided with a single burner defining a gas passage, comprising:

a gas passable solid disposed in the gas passage, said gas passable solid having a first end, a second opposed end, a first side and a second opposed side, the first end and the second end corresponding to the first side and the second side respectively, wherein air for combustion enters said gas passable solid from the first side and a flame is formed in a space downstream of the second end on the second side;

a fuel injection nozzle disposed on the first side of the said gas passable solid;

a premixture region defined by the gas passage of said single burner and formed between the second end of said gas passable solid and a tip end of said fuel injection nozzle pre-mixing fuel and air supplied to the pre-mixture region independently of each other for combustion; and a switching mechanism for switching air supply and gas exhaust provided outside said single burner, said single burner including a multi-port type burner having a plurality of ports, said gas passable solid being disposed in each of said plurality of ports of said single burner, said fuel injection nozzle being disposed in at least one but not all of said plurality of ports of said single burner, and wherein said plurality of ports of said single burner not including said at least one port in which said fuel injection nozzle is disposed are divided into two groups correlated so that when air for combustion is flowing through first portions in one of said two groups, exhaust gas is flowing through second ports in the other of said two groups, and so that said second ports cause exhaust gas to pass therethrough thereby storing heat of said exhaust gas in a gas passable solid of each of said second ports and said first ports cause air for combustion to pass therethrough thereby releasing heat which said gas passable solid of each of said first ports has stored to said air for combustion.

* * * * *